(No Model.)
A. F. JACKSON.
ORANGE SPOON.
No. 457,723. Patented Aug. 11, 1891.
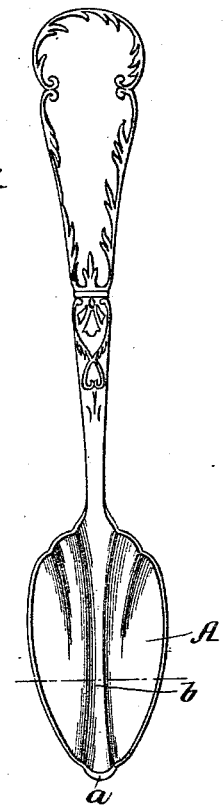
Fig.1.
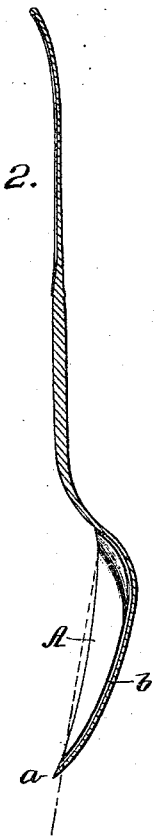
Fig.2.
Fig.3.
WITNESSES:
Fred G. Dieterich
Edw. W. Byrn
INVENTOR:
A. F. Jackson.
BY
ATTORNEYS
THE NORRIS PETERS CO., PHOTO-LITHO., WASHINGTON, D. C.

UNITED STATES PATENT OFFICE.

AUSTIN F. JACKSON, OF TAUNTON, MASSACHUSETTS, ASSIGNOR TO THE REED & BARTON CORPORATION, OF SAME PLACE.

ORANGE-SPOON.

SPECIFICATION forming part of Letters Patent No. 457,723, dated August 11, 1891.

Application filed March 11, 1891. Serial No. 384,636. (No model.)

*To all whom it may concern:*

Be it known that I, AUSTIN F. JACKSON, of Taunton, in the county of Bristol and State of Massachusetts, have invented a new and useful Improvement in Orange-Spoons, of which the following is a specification.

In eating oranges at the table a popular and delicate method is to divide the fruit transversely to its axis and then scoop out with a spoon the juice and pulp from the several cells or compartments. With the ordinary construction of spoon this method is liable to spurt the juice out into the face or upon the clothes.

My invention is designed to provide a form of spoon for obviating this objectionable contingency and rendering this method cleanly and satisfactory; and to that end it consists in a spoon having a bowl with a lip or projection at its end which is sharpened to a chisel-edge, and in connection therewith one or more grooves, creases, or channels, which allow the juice to run down into the bowl of the spoon from the ruptured orange-cells, instead of overflowing and dripping, as hereinafter fully described.

Figure 1 is a face or top side view of the spoon. Fig. 2 is a longitudinal section through the center of the bowl, and Fig. 3 is a transverse section through the same.

A is the bowl of the spoon, which is formed at the end with a prolate projecting lip $a$, whose curved outline is brought to a sharp cutting-edge, as shown in Fig. 2. From this end of the spoon and running down into the bowl is one or more grooves, channels, or creases $b$, which act as ducts or conduits for the orange-juice to lead it down into the bowl from the ruptured cells, instead of allowing it to flood and overflow the bowl and drip in transit to the mouth. With this form of spoon the sharp projecting lip readily cuts the pulp from the cells of the orange, the juices are prevented from dripping, and the operation is effected with delicacy, dispatch, and satisfaction.

To facilitate the action of the spoon in scooping out the juice and pulp, the bowl is made somewhat hook-shaped—*i. e.*, the plane of the rim of the bowl, instead of being flat, as usual, and as is indicated in dotted lines in Fig. 2, is curved, giving the tip or lip of the bowl a greater elevation.

Having thus described my invention, what I claim as new is—

A spoon having at the end of its bowl a lip or projection $a$, with a sharpened edge, and one or more grooves or channels leading therefrom down into the bowl, substantially as shown and described.

AUSTIN F. JACKSON.

Witnesses:
THEO. P. HALL,
JAMES P. HERSEY.